US012594730B2

(12) United States Patent (10) Patent No.: US 12,594,730 B2
Emig et al. (45) Date of Patent: Apr. 7, 2026

(54) METHOD OF FORMING A WIND TURBINE ROTOR BLADE

(71) Applicant: LM Wind Power A/S, Kolding (DK)

(72) Inventors: Matthew Joseph Emig, New Orleans, LA (US); Jesper Buch Thuesen, Kolding (DK); Peter Anthony Broome, Park Ridge, IL (US); Michael Blanc, Slidell, LA (US)

(73) Assignee: LM Wind Power A/S, Kolding (DK)

( * ) Notice: Subject to any disclaimer, the term of this patent is extended or adjusted under 35 U.S.C. 154(b) by 133 days.

(21) Appl. No.: 18/554,524

(22) PCT Filed: Apr. 11, 2022

(86) PCT No.: PCT/EP2022/059590
    § 371 (c)(1),
    (2) Date: Oct. 9, 2023

(87) PCT Pub. No.: WO2022/218904
    PCT Pub. Date: Oct. 20, 2022

(65) Prior Publication Data
    US 2024/0198602 A1     Jun. 20, 2024

(30) Foreign Application Priority Data
    Apr. 12, 2021   (EP) .................................... 21167856

(51) Int. Cl.
    B29C 65/70        (2006.01)
    B29C 65/54        (2006.01)
    (Continued)

(52) U.S. Cl.
    CPC .............. B29C 65/70 (2013.01); B29C 65/54 (2013.01); F03D 1/0675 (2013.01);
    (Continued)

(58) Field of Classification Search
    CPC .... B29C 65/20; B29C 65/54; B29L 2301/085
    (Continued)

(56) References Cited

U.S. PATENT DOCUMENTS

| | | | |
|---|---|---|---|
| 9,234,500 B2 | 1/2016 | Frederiksen | |
| 2018/0080432 A1 | 3/2018 | Bendel et al. | |
| 2023/0025564 A1 | 1/2023 | Colfelt et al. | |

FOREIGN PATENT DOCUMENTS

| | | |
|---|---|---|
| CN | 110733188 A | 1/2020 |
| DE | 102010055874 B3 | 4/2012 |
| (Continued) | | |

OTHER PUBLICATIONS

European Search Report Corresponding to EP21167856 on Oct. 4, 2021.

(Continued)

*Primary Examiner* — Christina A Johnson
*Assistant Examiner* — Xue H Liu
(74) *Attorney, Agent, or Firm* — Dority & Manning, P.A.

(57) ABSTRACT

A method of forming a rotor blade includes positioning first dry skin layer(s) in a first mold. The method also includes placing a wedge-shaped core material having a mounting surface atop the first dry skin(s) in the first mold at a trailing edge end of the rotor blade. The method further includes infusing the first dry skin layer(s) and the core material together via a resin material to form a first shell member. The method includes applying an adhesive onto the mounting surface and then placing a second mold with a second shell member arranged therein atop the first mold containing the first shell member to form the rotor blade such that a portion of the second shell member rests atop the mounting surface. Thus, the method includes securing the shell members together via the adhesive, wherein the core material supports the trailing edge end of the rotor blade.

12 Claims, 8 Drawing Sheets

(51) Int. Cl.
    *F03D 1/06*          (2006.01)
    *B29L 31/08*         (2006.01)

(52) U.S. Cl.
    CPC ... *B29L 2031/085* (2013.01); *F05B 2240/304*
        (2020.08); *F05B 2280/6012* (2013.01); *F05B*
                        *2280/6015* (2013.01)

(58) Field of Classification Search
    USPC ........................................................ 264/263
    See application file for complete search history.

(56)                   References Cited

FOREIGN PATENT DOCUMENTS

| EP | 2338668 A1 | 6/2011 |
| EP | 3838576 A1 | 6/2021 |

OTHER PUBLICATIONS

PCT International Search Report & Opinion Corresponding to PCT/EP2022/059590 on Jul. 14, 2022.

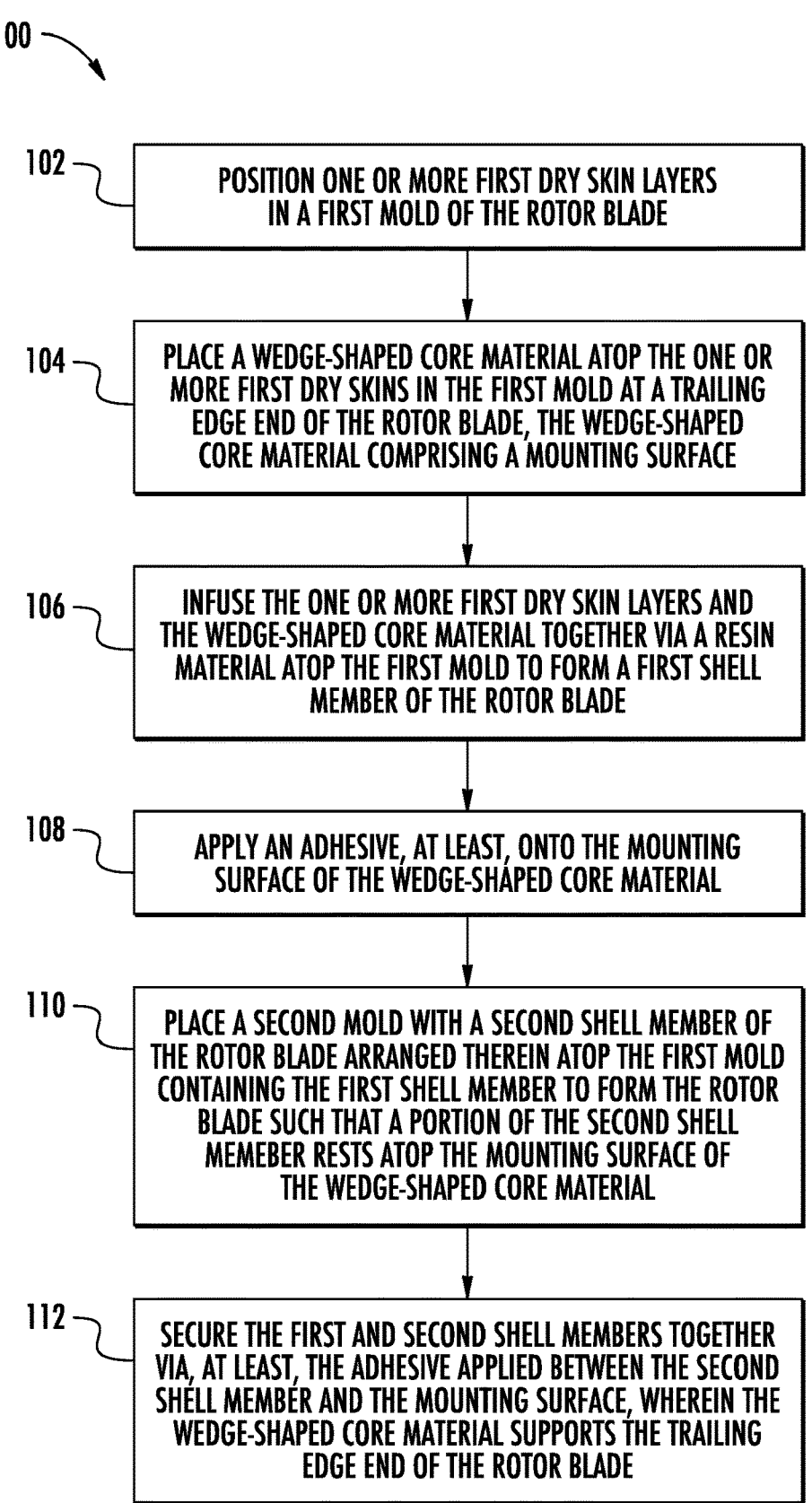

100

102  POSITION ONE OR MORE FIRST DRY SKIN LAYERS IN A FIRST MOLD OF THE ROTOR BLADE

104  PLACE A WEDGE-SHAPED CORE MATERIAL ATOP THE ONE OR MORE FIRST DRY SKINS IN THE FIRST MOLD AT A TRAILING EDGE END OF THE ROTOR BLADE, THE WEDGE-SHAPED CORE MATERIAL COMPRISING A MOUNTING SURFACE

106  INFUSE THE ONE OR MORE FIRST DRY SKIN LAYERS AND THE WEDGE-SHAPED CORE MATERIAL TOGETHER VIA A RESIN MATERIAL ATOP THE FIRST MOLD TO FORM A FIRST SHELL MEMBER OF THE ROTOR BLADE

108  APPLY AN ADHESIVE, AT LEAST, ONTO THE MOUNTING SURFACE OF THE WEDGE-SHAPED CORE MATERIAL

110  PLACE A SECOND MOLD WITH A SECOND SHELL MEMBER OF THE ROTOR BLADE ARRANGED THEREIN ATOP THE FIRST MOLD CONTAINING THE FIRST SHELL MEMBER TO FORM THE ROTOR BLADE SUCH THAT A PORTION OF THE SECOND SHELL MEMEBER RESTS ATOP THE MOUNTING SURFACE OF THE WEDGE-SHAPED CORE MATERIAL

112  SECURE THE FIRST AND SECOND SHELL MEMBERS TOGETHER VIA, AT LEAST, THE ADHESIVE APPLIED BETWEEN THE SECOND SHELL MEMBER AND THE MOUNTING SURFACE, WHEREIN THE WEDGE-SHAPED CORE MATERIAL SUPPORTS THE TRAILING EDGE END OF THE ROTOR BLADE

FIG. 4

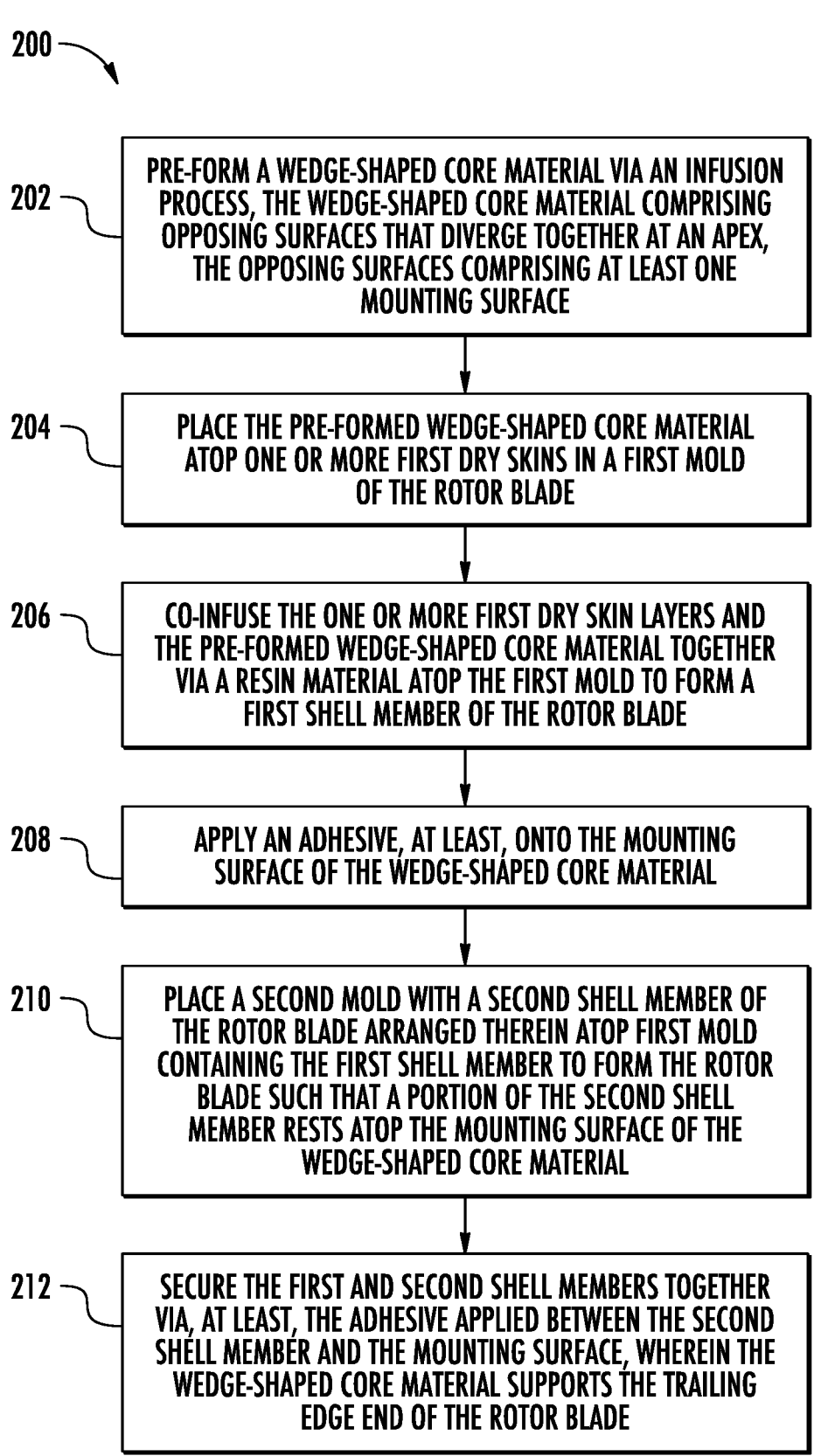

200

202 — PRE-FORM A WEDGE-SHAPED CORE MATERIAL VIA AN INFUSION PROCESS, THE WEDGE-SHAPED CORE MATERIAL COMPRISING OPPOSING SURFACES THAT DIVERGE TOGETHER AT AN APEX, THE OPPOSING SURFACES COMPRISING AT LEAST ONE MOUNTING SURFACE

204 — PLACE THE PRE-FORMED WEDGE-SHAPED CORE MATERIAL ATOP ONE OR MORE FIRST DRY SKINS IN A FIRST MOLD OF THE ROTOR BLADE

206 — CO-INFUSE THE ONE OR MORE FIRST DRY SKIN LAYERS AND THE PRE-FORMED WEDGE-SHAPED CORE MATERIAL TOGETHER VIA A RESIN MATERIAL ATOP THE FIRST MOLD TO FORM A FIRST SHELL MEMBER OF THE ROTOR BLADE

208 — APPLY AN ADHESIVE, AT LEAST, ONTO THE MOUNTING SURFACE OF THE WEDGE-SHAPED CORE MATERIAL

210 — PLACE A SECOND MOLD WITH A SECOND SHELL MEMBER OF THE ROTOR BLADE ARRANGED THEREIN ATOP FIRST MOLD CONTAINING THE FIRST SHELL MEMBER TO FORM THE ROTOR BLADE SUCH THAT A PORTION OF THE SECOND SHELL MEMBER RESTS ATOP THE MOUNTING SURFACE OF THE WEDGE-SHAPED CORE MATERIAL

212 — SECURE THE FIRST AND SECOND SHELL MEMBERS TOGETHER VIA, AT LEAST, THE ADHESIVE APPLIED BETWEEN THE SECOND SHELL MEMBER AND THE MOUNTING SURFACE, WHEREIN THE WEDGE-SHAPED CORE MATERIAL SUPPORTS THE TRAILING EDGE END OF THE ROTOR BLADE

*FIG. 7*

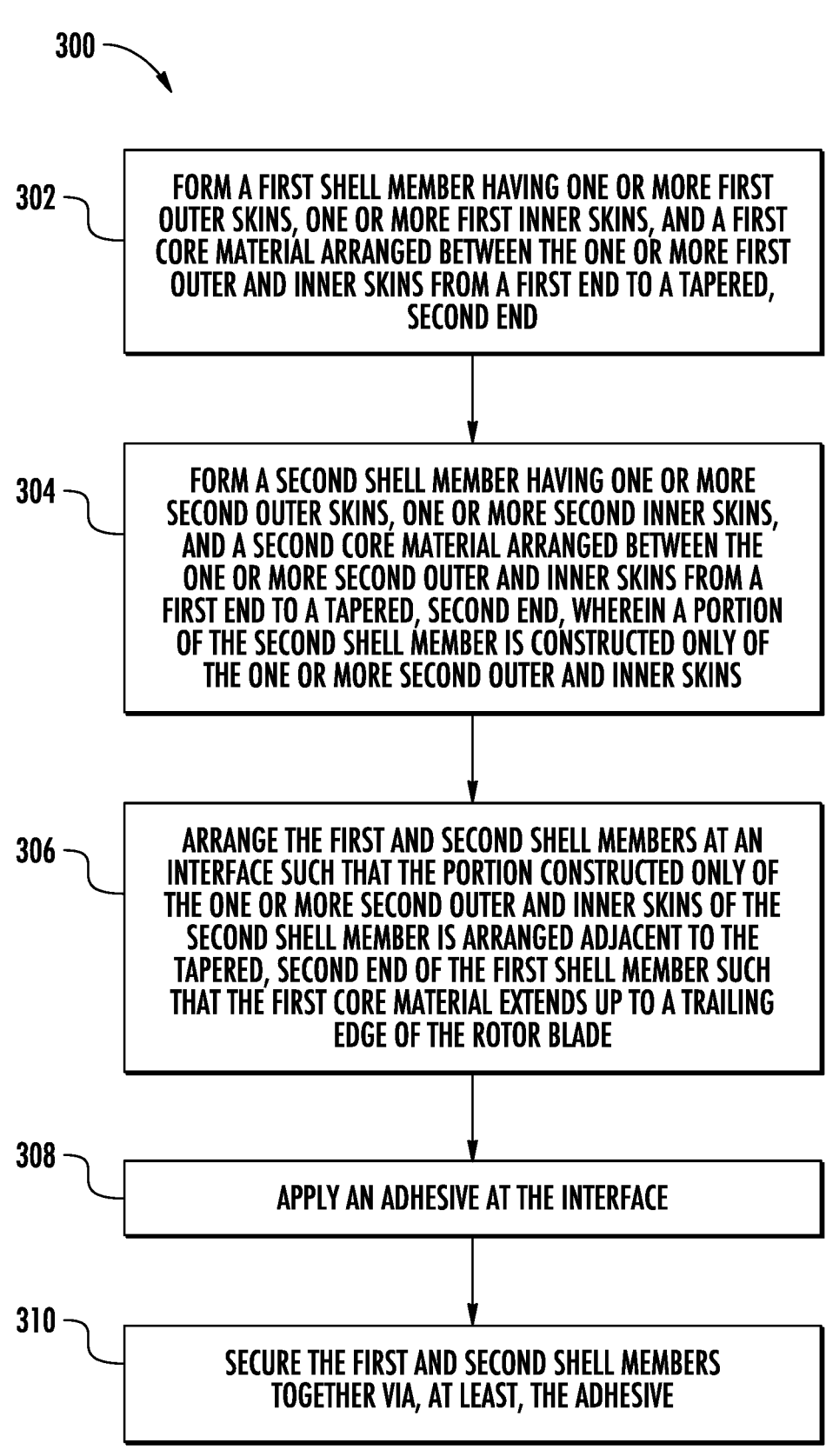

300

302 FORM A FIRST SHELL MEMBER HAVING ONE OR MORE FIRST OUTER SKINS, ONE OR MORE FIRST INNER SKINS, AND A FIRST CORE MATERIAL ARRANGED BETWEEN THE ONE OR MORE FIRST OUTER AND INNER SKINS FROM A FIRST END TO A TAPERED, SECOND END

304 FORM A SECOND SHELL MEMBER HAVING ONE OR MORE SECOND OUTER SKINS, ONE OR MORE SECOND INNER SKINS, AND A SECOND CORE MATERIAL ARRANGED BETWEEN THE ONE OR MORE SECOND OUTER AND INNER SKINS FROM A FIRST END TO A TAPERED, SECOND END, WHEREIN A PORTION OF THE SECOND SHELL MEMBER IS CONSTRUCTED ONLY OF THE ONE OR MORE SECOND OUTER AND INNER SKINS

306 ARRANGE THE FIRST AND SECOND SHELL MEMBERS AT AN INTERFACE SUCH THAT THE PORTION CONSTRUCTED ONLY OF THE ONE OR MORE SECOND OUTER AND INNER SKINS OF THE SECOND SHELL MEMBER IS ARRANGED ADJACENT TO THE TAPERED, SECOND END OF THE FIRST SHELL MEMBER SUCH THAT THE FIRST CORE MATERIAL EXTENDS UP TO A TRAILING EDGE OF THE ROTOR BLADE

308 APPLY AN ADHESIVE AT THE INTERFACE

310 SECURE THE FIRST AND SECOND SHELL MEMBERS TOGETHER VIA, AT LEAST, THE ADHESIVE

*FIG. 9*

METHOD OF FORMING A WIND TURBINE ROTOR BLADE

This application claims the benefit of EP Application Serial No. 21167856.0. filed Apr. 12, 2021, and International Application No.: PCT/EP2022/059590, filed on Apr. 11, 2022, which are incorporated by reference herein in their entirety.

FIELD

The present disclosure relates in general to wind turbine rotor blades, and more particularly to methods of forming wind turbine rotor blades having an improved trailing edge connection.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves.

In addition, conventional rotor blades require a substantial amount of bond paste to provide structure at various blade joints (e.g. at the leading or trailing edges of the rotor blade) to prevent local buckling of the suction and pressure side shells. Due to the complex geometry near these joint areas, it is often difficult to provide this structure in other ways that would be lighter than bond paste. Thus, conventional rotor blades typically utilize excess paste for the structure needed at the joints. Such excess paste, however, is expensive, heavy, and can limit the types of adhesives that can be used. For example, heavy and thick adhesive sections containing fast curing adhesives with high exothermic reactions can generate excess heat and damage the surrounding materials, thereby creating safety hazards.

In view of the foregoing, the art is continually seeking improved trailing edges for wind turbine rotor blades that address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method of forming a rotor blade. The method includes positioning one or more first dry skin layers in a first mold of the rotor blade. The method also includes placing a wedge-shaped core material atop the one or more first dry skins in the first mold at a trailing edge end of the rotor blade. The wedge-shaped core material includes a mounting surface. The method further includes infusing the one or more first dry skin layers and the wedge-shaped core material together via a resin material atop the first mold to form a first shell member of the rotor blade. Moreover, the method includes applying an adhesive, at least, onto the mounting surface of the wedge-shaped core material. In addition, the method includes placing a second mold with a second shell member of the rotor blade arranged therein atop the first mold containing the first shell member to form the rotor blade such that a portion of the second shell member rests atop the mounting surface of the wedge-shaped core material. Thus, the method includes securing the first and second shell members together via, at least, the adhesive applied between the second shell member and the mounting surface, wherein the wedge-shaped core material supports the trailing edge end of the rotor blade. Since the adhesive is applied between the second shell member and the mounting surface, it is clear that the mounting surface is connected directly to the second shell member via the adhesive.

In an embodiment, the method may include forming the second shell member by positioning one or more second dry skin layers atop the second mold and infusing the one or more second dry skin layers with the resin material prior to placing the second mold atop the first mold.

In another embodiment, the method may include forming the wedge-shaped core material with at least one structural component embedded therein. For example, in one embodiment, the structural component(s) embedded in the wedge-shaped core material may have an I-beam cross-section.

In particular embodiments, the wedge-shaped core material may have a solid cross-section. In further embodiments, the wedge-shaped core material may be constructed of a high-density foam. In several embodiments, the wedge-shaped core material contacts inner surfaces of the first and second shell members.

In additional embodiments, the wedge-shaped core material may define a first end and an opposing, second end, with the second end being adjacent to a trailing edge of the rotor blade.

In yet another embodiment, the resin material may be, for example, a thermoset material or a thermoplastic material.

In another aspect, the present disclosure is directed to a method of forming a rotor blade. The method includes pre-forming a wedge-shaped core material via an infusion process. The wedge-shaped core material includes opposing surfaces that diverge together at an apex. Further, the opposing surfaces include at least one mounting surface. The method also include placing the pre-formed wedge-shaped core material atop one or more first dry skins in a first mold of the rotor blade. Moreover, the method includes co-infusing the one or more first dry skin layers and the pre-formed wedge-shaped core material together via a resin material atop the first mold to form a first shell member of the rotor blade. In addition, the method includes applying an adhesive, at least, onto the mounting surface of the wedge-shaped core material. As such, the method further includes placing a second mold with a second shell member of the rotor blade arranged therein atop the first mold containing the first shell member to form the rotor blade such that a portion of the second shell member rests atop the mounting surface of the wedge-shaped core material. Thus, the method includes securing the first and second shell members together via, at least, the adhesive applied between the second shell member and the mounting surface, wherein the wedge-shaped core material supports the trailing edge end of the rotor blade. It should be understood that the method may further include any of the additional features and/or steps as described herein.

In yet another aspect, the present disclosure is directed to a method of forming a rotor blade. The method includes forming a first shell member having one or more first outer skins, one or more first inner skins, and a first core material arranged between the one or more first outer and inner skins from a first end to a tapered, second end. The method also includes forming a second shell member having one or more second outer skins, one or more second inner skins, and a second core material arranged between the one or more second outer and inner skins from a first end to a tapered, second end. Further, a portion of the second shell member is constructed only of the one or more second outer and inner skins. Thus, the method includes arranging the first and second shell members at an interface such that the portion constructed only of the one or more second outer and inner skins of the second shell member is arranged adjacent to the tapered, second end of the first shell member such that the first core material extends up to a trailing edge of the rotor blade. The method also includes applying an adhesive at the interface. In addition, the method includes securing the first and second shell members together via, at least, the adhesive. It should be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 illustrates a flow diagram of one embodiment of a method of forming a rotor blade according to the present disclosure;

FIG. 7 illustrates a flow diagram of another embodiment of a method of forming a rotor blade according to the present disclosure;

FIG. 9 illustrates a flow diagram of still another embodiment of a method of forming a rotor blade according to the present disclosure.

DETAILED DESCRIPTION

Figure 1:
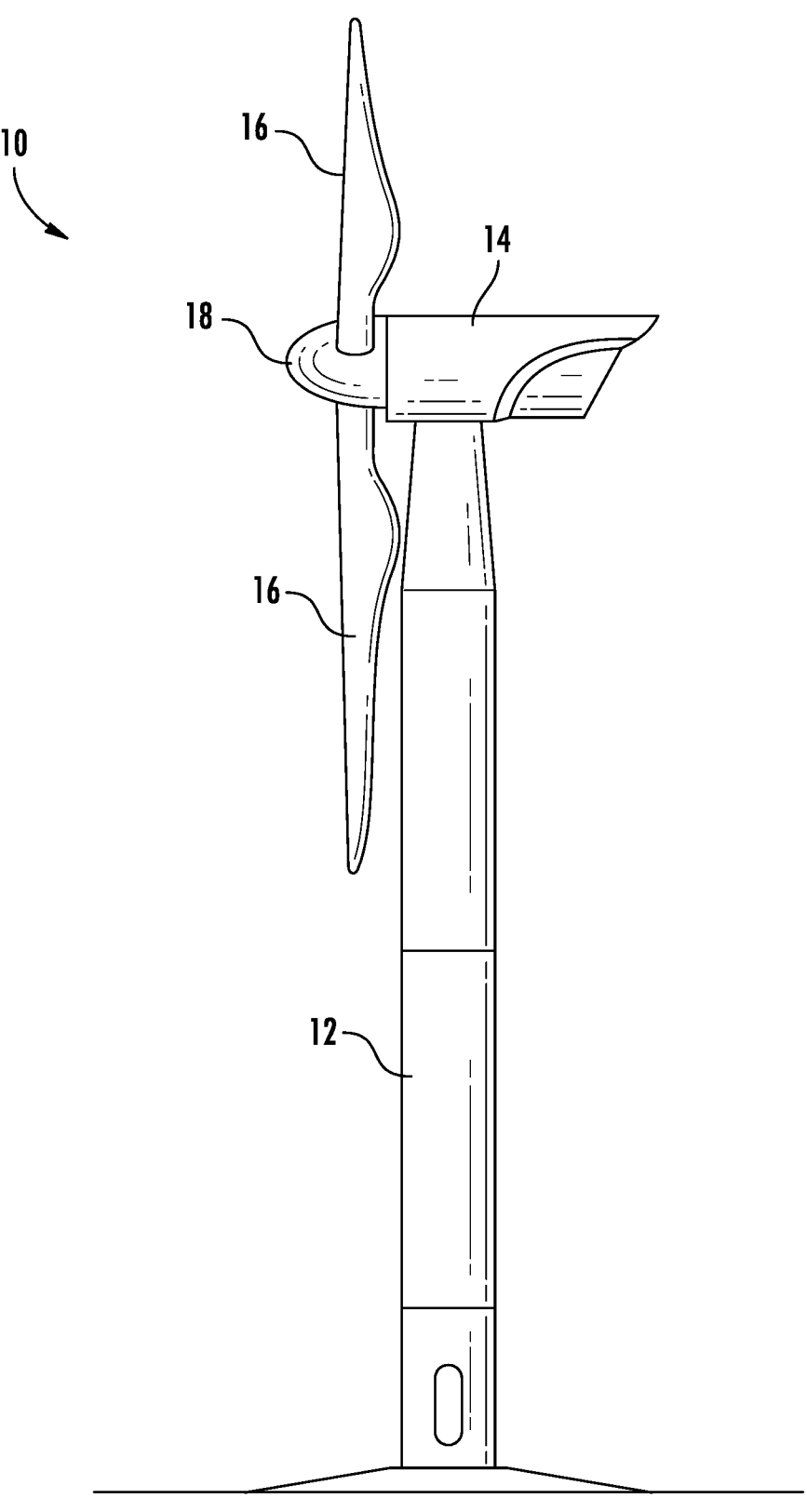
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a method of forming a rotor blade of a wind turbine with an improved trailing edge connection. In one embodiment, a pre-kitted wedge-shaped core material (such as high-density foam) wrapped in fiberglass may be placed onto one or more first dry skin layers and infused with the dry skin layer(s) to form a first shell member. In another embodiment, an infused wedge-shaped core material may be placed onto one or more first dry skin layers and further infused with the dry skin layer(s) to form a first shell member. The first shell member thus provides a mounting surface or flange for an adhesive connection with a second shell member. The first and second shell members can then be easily secured together at the trailing edge via adhesive (such as glue, paste, or any other suitable adhesive, or similar). The first shell member thus provides a mounting surface or flange for an adhesive connection with a second shell member. The first and second shell members can then be easily secured together at the trailing edge via adhesive.

As such, the methods of the present disclosure provide many benefits not present in the prior art. For example, the methods of the present disclosure eliminate the need for a silicone profile to shape the fiberglass to construct the adhesive flange. Furthermore, the core material/foam is lightweight for easier handling and can be easily modified in shape to fit any blade type. In addition, the stiffness of the core material assists an operator with more accurately placing the wedge-shaped core material onto the dry skins, which was a challenge with the flexible silicone profile.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades. Further, the methods described herein may also apply to manufacturing any similar structure that benefits from printing a structure directly to skins within a mold before the skins have cooled so as to take advantage of the heat from the skins to provide adequate bonding between the printed structure and the skins. As such, the need for additional adhesive or additional curing is eliminated.

Figure 2:
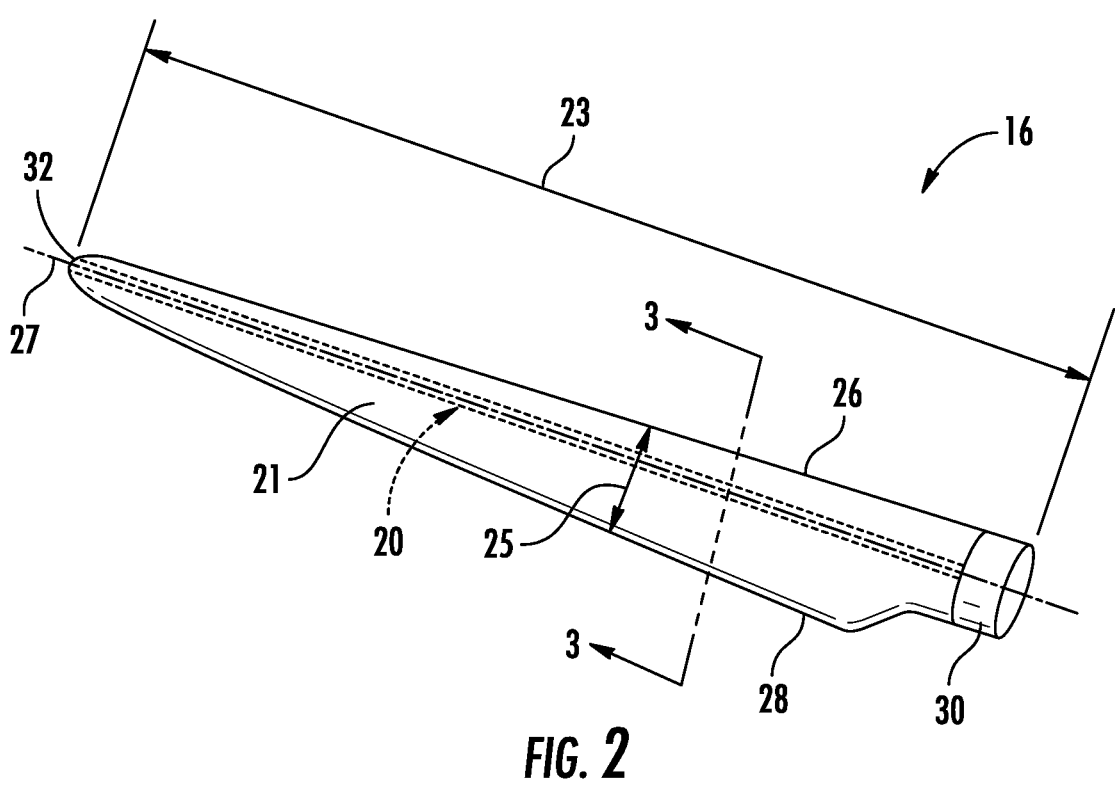
FIG. 2 illustrates a perspective view of one of the rotor blades of FIG. 1.
Figure 3:
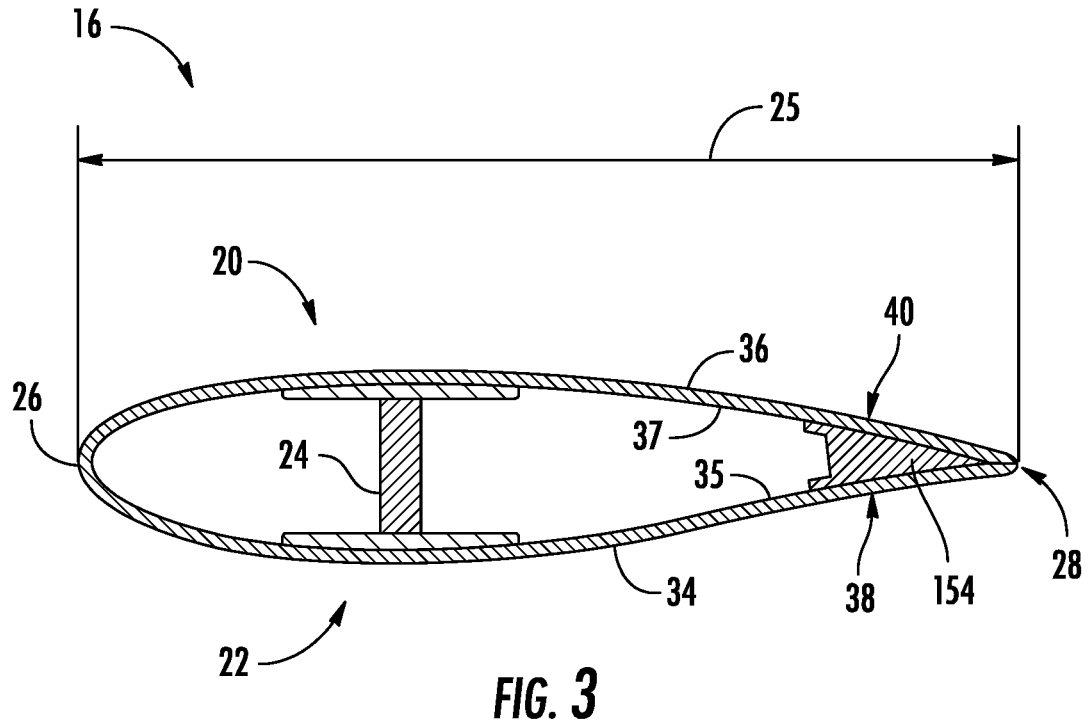
FIG. 3 illustrates a cross-sectional view of the rotor blade assembly of FIG. 2 along line 3-3.

Referring now to FIGS. 2 and 3, perspective and cross-sectional views of one of the rotor blades 16 according to the present disclosure are illustrated. As shown, the rotor blade 16 generally includes a blade root 30 configured to be mounted or otherwise secured to the hub 18 (FIG. 1) of the wind turbine 10 and a blade tip 32 disposed opposite the blade root 30. A body shell 21 of the rotor blade generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing edges 26, 28 of the rotor blade 16. Further, the rotor blade 16 may also have a span 23 defining the total length between the blade root 30 and the blade tip 32 and a chord 25 defining the total length between the leading edge 26 and the trialing edge 28. As is generally understood, the chord 25 may vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components. For example, the body shell 21 may be manufactured from a first shell half generally defining the pressure side 34 of the rotor blade 16 and a second shell half generally defining the suction side 36 of the rotor blade 16, with such shell halves being secured to one another at the leading and trailing ends 26, 28 of the blade 16.

Additionally, the body shell 21 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material. In addition, the body shell 21 may be constructed, at least in part, from a thermoset and/or a thermoplastic material.

The thermoplastic materials described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as mentioned, the thermoplastic and/or the thermoset material described herein may optionally be reinforced with a fiber material, including but not limited to glass fibers, carbon fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. Further, the fiber content may vary depending on the desired stiffness, and/or the location within the rotor blade 16.

Referring particularly to FIG. 3, the rotor blade 16 may also include one or more longitudinally extending structural components configured to provide increased stiffness, buckling resistance, and/or strength to the rotor blade 16. For example, the rotor blade 16 may include one or more longitudinally extending spar caps 20, 22 configured to be engaged against the opposing inner surfaces 35, 37 of the pressure and suction sides 34, 36 of the rotor blade 16, respectively. Additionally, one or more shear webs 24 may be disposed between the spar caps 20, 22 so as to form a beam-like configuration. The spar caps 20, 22 may generally be designed to control the bending stresses and/or other loads acting on the rotor blade 16 in a generally span-wise direction (a direction parallel to the span 23 of the rotor blade 16) during operation of a wind turbine 10. Similarly, the spar caps 20, 22 may also be designed to withstand the span-wise compression occurring during operation of the wind turbine 10.

Referring now to FIG. 4, a flow diagram of one embodiment of a method 100 of forming a rotor blade is illustrated. In general, the method 100 will be described herein with reference to the rotor blade 16 described above with reference to FIGS. 1-3. However, it should be appreciated by those of ordinary skill in the art that the disclosed method 100 may generally be utilized to manufacture any other rotor blade having any suitable configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Figure 5:
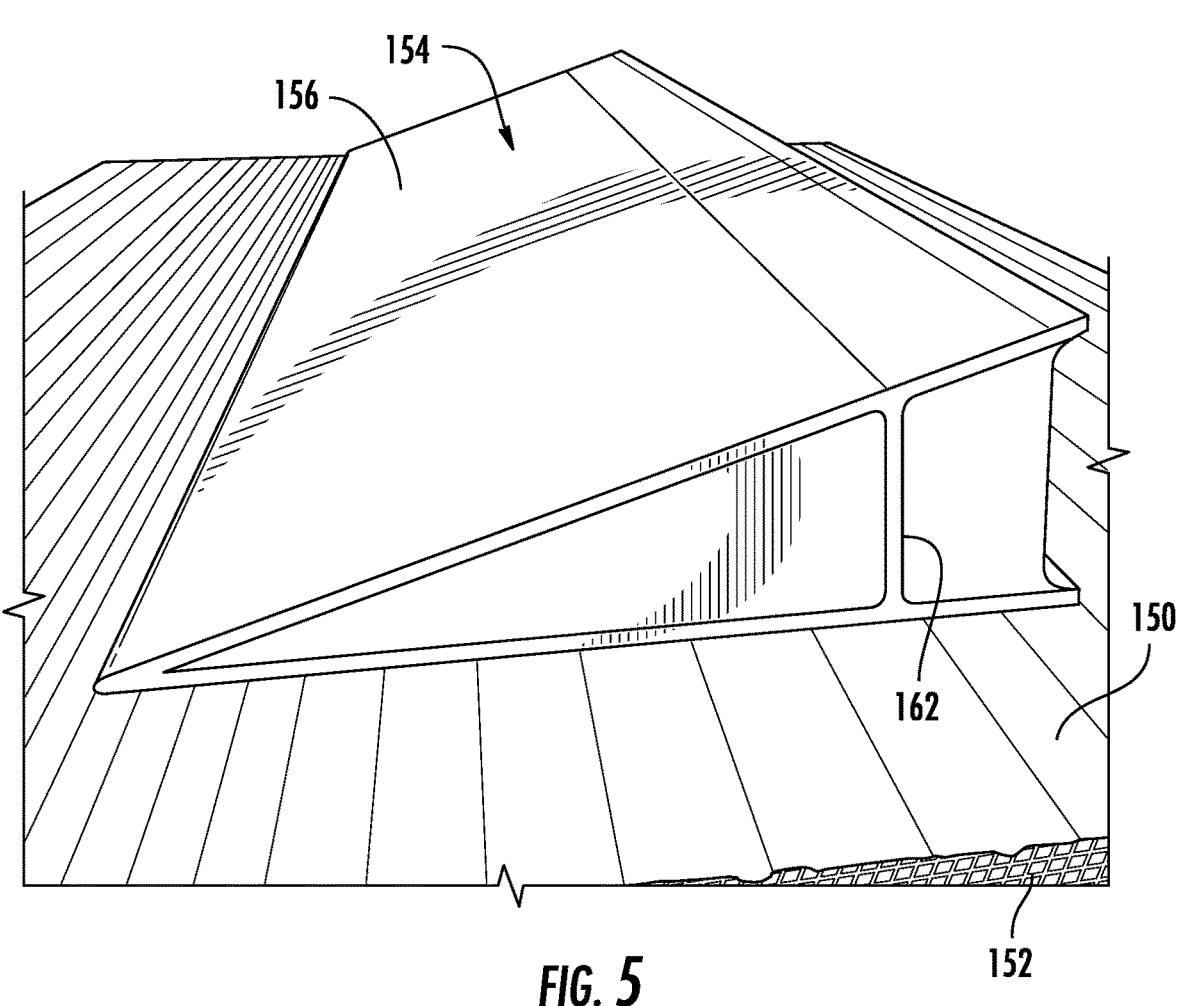
FIG. 5 illustrates a detailed, perspective view of one embodiment of a step in the process of assembling a rotor blade according to the present disclosure.

As shown at (102), the method 100 includes positioning one or more first dry skin layers in a first mold of the rotor blade 16. As shown at (104), the method 100 includes placing a wedge-shaped core material atop the one or more first dry skins in the first mold at a trailing edge end of the rotor blade 16. For example, as shown in FIG. 5, the dry skin layer(s) 150 are placed atop the first mold 152. Furthermore, the wedge-shaped core material 154 is placed atop the first dry skins(s) 152 and includes a mounting surface 156.

Figure 6:
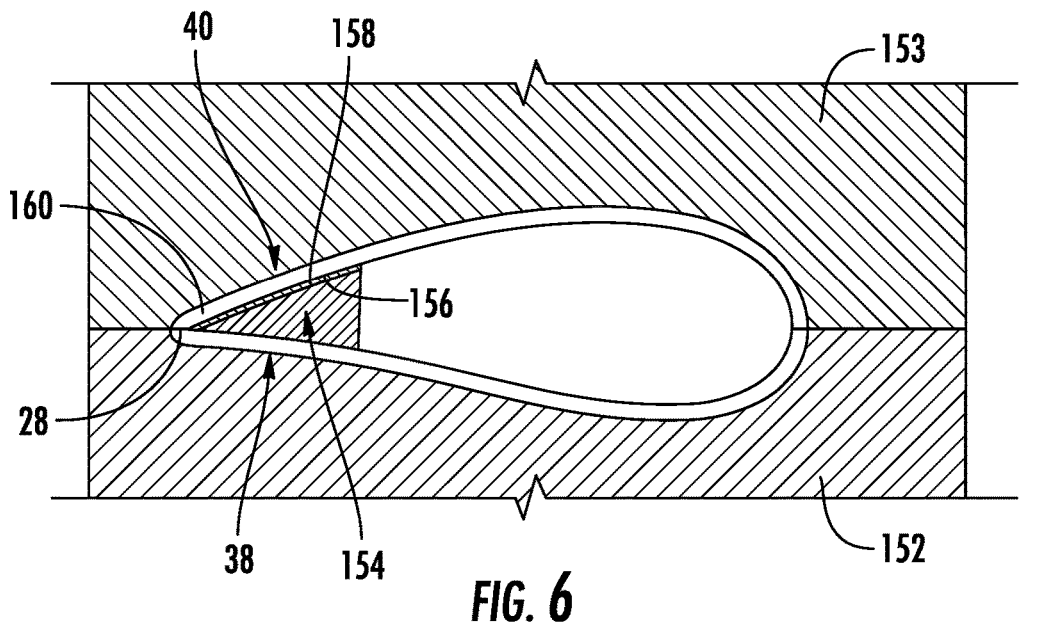
FIG. 6 illustrates a cross-sectional view of one embodiment of another step in the process of assembling a rotor blade according to the present disclosure.

In another embodiment, the method 100 may include forming the wedge-shaped core material 154 with at least one structural component 162 embedded therein. For example, in one embodiment, as shown in FIG. 5, the structural component(s) 162 embedded in the wedge-shaped core material 154 may have an I-beam cross-section or any other shape to provide structural support thereto. In further embodiments, as shown in FIGS. 3, 5, and 6, the wedge-shaped core material 154 may have a solid cross-section. Moreover, in an embodiment, the wedge-shaped core material 154 may be constructed of a high-density foam (e.g., such as polystyrene foam).

In additional embodiments, the wedge-shaped core material may define a first end and an opposing, second end, with the second end being adjacent to a trailing edge of the rotor blade 16.

Referring back to FIG. 4, as shown at (106), the method 100 includes infusing the first dry skin layer(s) 150 and the wedge-shaped core material 154 together via a resin material (e.g., such as thermoplastic resin or thermoset resin) atop the first mold 152 to form a first shell member of the rotor blade 16. For example, as shown in FIG. 3, the first shell member is illustrated as reference character 38.

Referring back to FIG. 4, as shown at (108), the method 100 includes applying an adhesive 158, at least, onto the mounting surface 156 of the wedge-shaped core material 154. For example, as shown in FIG. 6, adhesive 158 is applied on the mounting surface 156 of the wedge-shaped core material 154. In such embodiments, the adhesive 158 may include, for example, glue, paste, or any other suitable adhesive, or similar.

Referring back to FIG. 4, as shown at (110), the method 100 includes placing a second mold 153 with a second shell member 40 of the rotor blade 16 arranged therein atop the first mold 152 containing the first shell member 38 to form the rotor blade 16 such that a portion of the second shell member 40 rests atop the mounting surface 156 of the wedge-shaped core material 154. For example, as shown in FIG. 6, a portion 160 of the second shell member 40 rests atop the mounting surface 156 of the wedge-shaped core material 154. Thus, in such embodiments, as shown in FIGS. 3 and 6, the wedge-shaped core material 154 contacts inner surfaces of the first and second shell members 38, 40.

In an embodiment, the method 100 may include forming the second shell member 40 by positioning one or more second dry skin layers atop the second mold 153 and infusing the second dry skin layers with the resin material to form the second shell member 40 prior to placing the second mold 153 atop the first mold 152. In other words, the second shell member 40 is already formed when placed adjacent to the first shell member 38.

Accordingly, as shown at (112), the method 100 includes securing the first and second shell members 38, 40 together via, at least, the adhesive 158 applied between the second shell member 40 and the mounting surface 156. Thus, in the final rotor blade, the wedge-shaped core material 154 supports the trailing edge end of the rotor blade 16.

Referring now to FIG. 7, a flow diagram of one embodiment of a method 200 of forming a rotor blade is illustrated. In general, the method 200 will be described herein with reference to the rotor blade 16 described above with reference to FIGS. 1-3. However, it should be appreciated by those of ordinary skill in the art that the disclosed method

200 may generally be utilized to manufacture any other rotor blade having any suitable configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Figure 8:
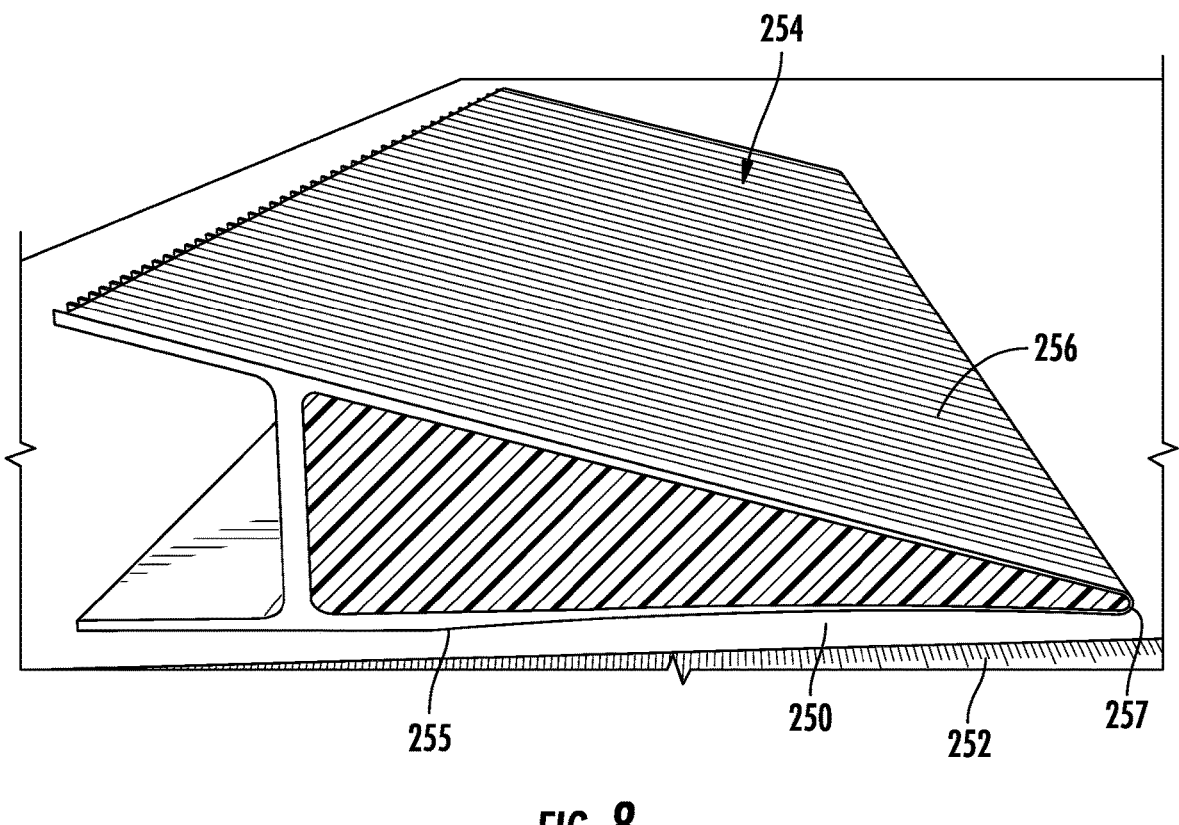
FIG. 8 illustrates a detailed, perspective view of another embodiment of a step in the process of assembling a rotor blade according to the present disclosure.

As shown at (202), the method 200 includes pre-forming a wedge-shaped core material 254 via an infusion process. For example, as shown in FIG. 8, the wedge-shaped core material 254 includes opposing surfaces 255, 256 that diverge together at an apex 257. Further, as shown, the opposing surfaces 255, 256 include at least one mounting surface 256.

Referring back to FIG. 7, as shown at (204), the method 200 includes placing the pre-formed wedge-shaped core material 254 atop one or more first dry skins 250 in a first mold 252 of the rotor blade 16. Thus, as shown at (206), the method 200 includes co-infusing the first dry skin layer(s) 250 and the pre-formed wedge-shaped core material 254 together via a resin material atop the first mold 252 to form the first shell member 38 of the rotor blade 16. As shown at (208), the method 200 includes applying an adhesive, at least, onto the mounting surface 256 of the wedge-shaped core material 254. As shown at (210), the method 200 includes placing a second mold (e.g., as described with reference to FIG. 6) with a second shell member 40 of the rotor blade 16 arranged therein atop the first mold containing the first shell member to form the rotor blade 16 such that a portion of the second shell member rests atop the mounting surface 256 of the wedge-shaped core material 254. Thus, as shown at (212), the method 200 includes securing the first and second shell members 38, 40 together via, at least, the adhesive applied between the second shell member 40 and the mounting surface 256, wherein the wedge-shaped core material 254 supports the trailing edge end of the rotor blade 16.

Referring now to FIG. 8, a flow diagram of one embodiment of a method 300 of forming a rotor blade is illustrated. In general, the method 300 will be described herein with reference to the rotor blade 16 described above with reference to FIGS. 1-3. However, it should be appreciated by those of ordinary skill in the art that the disclosed method 300 may generally be utilized to manufacture any other rotor blade having any suitable configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Figure 10:
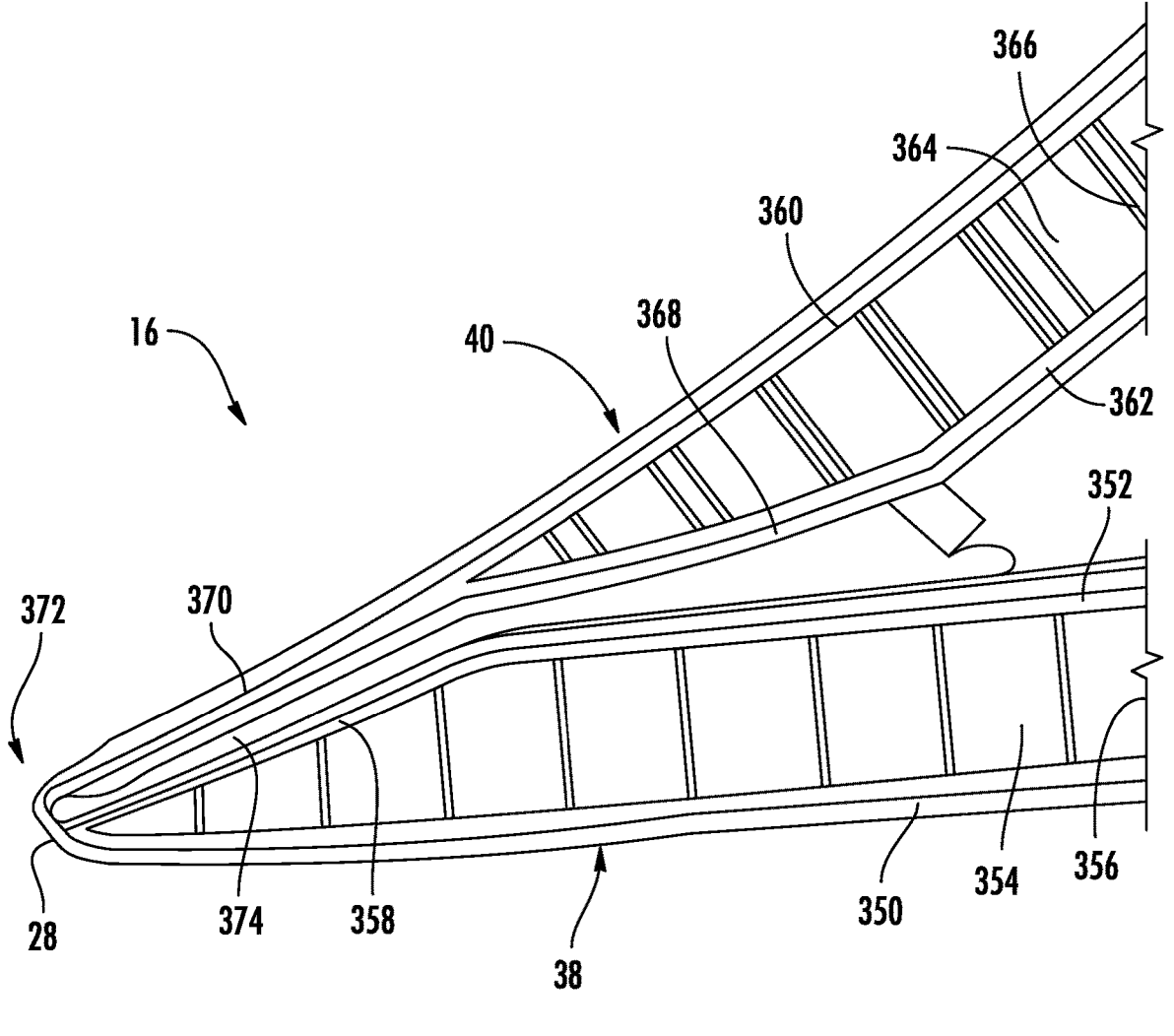
FIG. 10 illustrates a partial, cross-sectional view of yet another embodiment of a rotor blade assembled according to the present disclosure.

As shown at (302), the method 300 includes forming a first shell member 38 having one or more first outer skins 350, one or more first inner skins 352, and a first core material 354 arranged between the first outer and inner skins 350, 352 from a first end 356 to a tapered, second end 358. As shown at (304), the method 300 includes forming a second shell member 40 having one or more second outer skins 360, one or more second inner skins 362, and a second core material 364 arranged between the second outer and inner skins 360, 362 from a first end 366 to a tapered, second end 368. Further, as shown particularly in FIG. 10, a portion 370 of the second shell member 40 is constructed only of the second outer and inner skins 360, 362, i.e., the portion is absent to the core material 366. Thus, referring back to FIG. 9, as shown at (306), the method 300 includes arranging the first and second shell members 38, 40 at an interface 372 such that the portion 370 constructed only of the second outer and inner skins 360, 362 of the second shell member 40 is arranged adjacent to the tapered, second end 358 of the first shell member 38 such that the first core material 354 extends up to (or closer to) the trailing edge 28 of the rotor blade 16. Moreover, as shown at (308), the method 300 includes applying an adhesive 374 at the interface 372 (and as further illustrated in FIG. 10). In addition, as shown at (310), the method 300 includes securing the first and second shell members 38, 40 together via, at least, the adhesive 374.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Exemplary embodiments of the present disclosure are set out in the following items:

1. A method of forming a rotor blade, the method comprising:
   positioning one or more first dry skin layers in a first mold of the rotor blade;
   placing a wedge-shaped core material atop the one or more first dry skins in the first mold at a trailing edge end of the rotor blade, the wedge-shaped core material comprising a mounting surface;
   infusing the one or more first dry skin layers and the wedge-shaped core material together via a resin material atop the first mold to form a first shell member of the rotor blade;
   applying an adhesive, at least, onto the mounting surface of the wedge-shaped core material;
   placing a second mold with a second shell member of the rotor blade arranged therein atop the first mold containing the first shell member to form the rotor blade such that a portion of the second shell member rests atop the mounting surface of the wedge-shaped core material; and,
   securing the first and second shell members together via, at least, the adhesive applied between the second shell member and the mounting surface, wherein the wedge-shaped core material supports the trailing edge end of the rotor blade.

2. The method of item 1, further comprising forming the second shell member by positioning one or more second dry skin layers atop the second mold and infusing the one or more second dry skin layers with the resin material prior to placing the second mold atop the first mold.

3. The method of items 1-2, further comprising forming the wedge-shaped core material with at least one structural component embedded therein.

4. The method of item 3, wherein the at least one structural component embedded in the wedge-shaped core material comprises an I-beam cross-section.

5. The method of any of the preceding items, wherein the wedge-shaped core material comprises a solid cross-section.

6. The method of any of the preceding items, wherein the wedge-shaped core material is constructed of a high-density foam.

7. The method of any of the preceding items, wherein the wedge-shaped core material contacts inner surfaces of the first and second shell members.

8. The method of any of the preceding items, wherein the wedge-shaped core material defines a first end and an opposing, second end, the second end being adjacent to a trailing edge of the rotor blade.

9. The method of any of the preceding items, wherein the resin material comprises at least one of a thermoset material or a thermoplastic material.

10. A method of forming a rotor blade, the method comprising:
   pre-forming a wedge-shaped core material via an infusion process, the wedge-shaped core material comprising opposing surfaces that diverge together at an apex, the opposing surfaces comprising at least one mounting surface;
   placing the pre-formed wedge-shaped core material atop one or more first dry skins in a first mold of the rotor blade;
   co-infusing the one or more first dry skin layers and the pre-formed wedge-shaped core material together via a resin material atop the first mold to form a first shell member of the rotor blade;
   applying an adhesive, at least, onto the mounting surface of the wedge-shaped core material;
   placing a second mold with a second shell member of the rotor blade arranged therein atop the first mold containing the first shell member to form the rotor blade such that a portion of the second shell member rests atop the mounting surface of the wedge-shaped core material; and,
   securing the first and second shell members together via, at least, the adhesive applied between the second shell member and the mounting surface, wherein the wedge-shaped core material supports the trailing edge end of the rotor blade.

11. The method of item 10, further comprising forming the second shell member by positioning one or more second dry skin layers atop the second mold and infusing the one or more second dry skin layers with the resin material prior to placing the second mold atop the first mold.

12. The method of items 10-11, further comprising surface prepping one or more of the opposing surfaces to promote bonding during co-infusion.

13. The method of items 10-12, further comprising forming the wedge-shaped core material with at least one structural component embedded therein.

14. The method of item 13, wherein the at least one structural component embedded in the wedge-shaped core material comprises an I-beam cross-section.

15. The method of items 10-14, wherein the wedge-shaped core material comprises a solid cross-section.

16. The method of items 10-15, wherein the wedge-shaped core material is constructed of a high-density foam.

17. The method of items 10-16, wherein the wedge-shaped core material contacts inner surfaces of the first and second shell members.

18. The method of items 10-17, wherein the wedge-shaped core material defines a first end and an opposing, second end, the second end being adjacent to a trailing edge of the rotor blade.

19. The method of items 10-18, wherein the resin material comprises at least one of a thermoset material or a thermoplastic material.

20. A method of forming a rotor blade, the method comprising:

forming a first shell member having one or more first outer skins, one or more first inner skins, and a first core material arranged between the one or more first outer and inner skins from a first end to a tapered, second end;

forming a second shell member having one or more second outer skins, one or more second inner skins, and a second core material arranged between the one or more second outer and inner skins from a first end to a tapered, second end, wherein a portion of the second shell member is constructed only of the one or more second outer and inner skins;

arranging the first and second shell members at an interface such that the portion constructed only of the one or more second outer and inner skins of the second shell member is arranged adjacent to the tapered, second end of the first shell member such that the first core material extends up to a trailing edge of the rotor blade;

applying an adhesive at the interface; and, securing the first and second shell members together via, at least, the adhesive.

What is claimed is:

1. A method of forming a rotor blade, the method comprising:

positioning one or more first dry skin layers in a first mold of the rotor blade;

placing a wedge-shaped core material atop the one or more first dry skins layers in the first mold at a trailing edge end of the rotor blade, the wedge-shaped core material comprising a mounting surface;

infusing the one or more first dry skin layers and the wedge-shaped core material together via a resin material atop the first mold to form a first shell member of the rotor blade;

applying an adhesive, at least, onto the mounting surface of the wedge-shaped core material;

placing a second mold with a second shell member of the rotor blade arranged therein atop the first mold containing the first shell member to form the rotor blade such that a portion of the second shell member rests atop the mounting surface of the wedge-shaped core material; and, securing the first and second shell members together via, at least, the adhesive applied between the second shell member and the mounting surface, wherein the wedge-shaped core material supports the trailing edge end of the rotor blade, wherein the wedge-shaped core material contacts inner surfaces of the first and second shell members.

2. The method of claim 1, further comprising forming the second shell member by positioning one or more second dry skin layers atop the second mold and infusing the one or more second dry skin layers with the resin material prior to placing the second mold atop the first mold.

3. The method of claim 1, further comprising forming the wedge-shaped core material with at least one structural component embedded therein.

4. The method of claim 3, wherein the at least one structural component embedded in the wedge-shaped core material comprises an I-beam cross-section.

5. The method of claim 1, wherein the wedge-shaped core material comprises a solid cross-section.

6. The method of claim 1, wherein the wedge-shaped core material is constructed of a foam material.

7. The method of claim 1, wherein the wedge-shaped core material defines a first end and an opposing, second end, the second end being adjacent to a trailing edge of the rotor blade.

8. The method of claim 1, wherein the resin material comprises at least one of a thermoset material or a thermoplastic material.

9. A method of forming a rotor blade, the method comprising:

positioning one or more first dry skin layers in a first mold of the rotor blade;

forming a wedge-shaped core material with at least one structural component embedded therein;

placing the wedge-shaped core material atop the one or more first dry skins layers in the first mold at a trailing edge end of the rotor blade, the wedge-shaped core material comprising a mounting surface;

infusing the one or more first dry skin layers and the wedge-shaped core material together via a resin material atop the first mold to form a first shell member of the rotor blade;

applying an adhesive, at least, onto the mounting surface of the wedge-shaped core material;

placing a second mold with a second shell member of the rotor blade arranged therein atop the first mold containing the first shell member to form the rotor blade such that a portion of the second shell member rests atop the mounting surface of the wedge-shaped core material; and, securing the first and second shell members together via, at least, the adhesive applied between the second shell member and the mounting surface, wherein the wedge-shaped core material supports the trailing edge end of the rotor blade.

10. The method of claim 9, wherein the wedge-shaped core material is constructed of a foam material.

11. The method of claim 9, wherein the at least one structural component embedded in the wedge-shaped core material comprises an I-beam cross-section.

12. A method of forming a rotor blade, the method comprising:

positioning one or more first dry skin layers in a first mold of the rotor blade;

placing a wedge-shaped core material atop the one or more first dry skins layers in the first mold at a trailing edge end of the rotor blade, the wedge-shaped core material comprising a mounting surface;

infusing the one or more first dry skin layers and the wedge-shaped core material together via a resin material atop the first mold to form a first shell member of the rotor blade;

applying an adhesive, at least, onto the mounting surface of the wedge-shaped core material;

placing a second mold with a second shell member of the rotor blade arranged therein atop the first mold containing the first shell member to form the rotor blade such that a portion of the second shell member rests atop the mounting surface of the wedge-shaped core material; and, securing the first and second shell members together via, at least, the adhesive applied between the second shell member and the mounting surface, wherein the wedge-shaped core material supports the trailing edge end of the rotor blade, wherein the wedge-shaped core material is constructed of a foam material.

* * * * *